United States Patent [19]

Pandapas, Jr.

[11] 3,969,973
[45] July 20, 1976

[54] DEVICES FOR SELECTIVE DISPLAY OF INFORMATION
[76] Inventor: George Pandapas, Jr., 322 W. 72nd St., New York, N.Y. 10003
[22] Filed: June 16, 1975
[21] Appl. No.: 587,246

[52] U.S. Cl. .............................. 84/474; 235/88 R
[51] Int. Cl.² .......................................... G09B 15/02
[58] Field of Search ............ 84/473, 474, 475, 470, 84/471 SR; 235/88 R, 84

[56] References Cited
UNITED STATES PATENTS

| | | | |
|---|---|---|---|
| 675,345 | 5/1901 | Bauer | 84/474 |
| 1,643,303 | 9/1927 | Jones | 84/474 |
| 2,657,610 | 11/1953 | Carran, Jr. | 84/473 |
| 3,481,241 | 12/1969 | Gaillard | 84/474 |
| 3,592,099 | 7/1971 | Gibby | 84/474 |
| 3,635,122 | 1/1972 | Perrault | 84/473 |
| 3,728,932 | 4/1973 | Leonard | 84/474 |

Primary Examiner—Stephen J. Tomsky
Attorney, Agent, or Firm—Watson Leavenworth Kelton & Taggart

[57] ABSTRACT

A musical information display device includes first and second relatively rotatable members, the first member bearing spaced musical indicia and the second member including apertures registrable with the first member indicia on such rotation and aperture-closing elements, each operable independently of the condition of closure of the remainder of such elements. The musical indicia are arranged in such progression as the chromatic scale and numeric identifiers are associated with the aperture-closing elements and are arranged in sequential order to be displayed selectively on operation of the aperture-closing elements.

15 Claims, 7 Drawing Figures

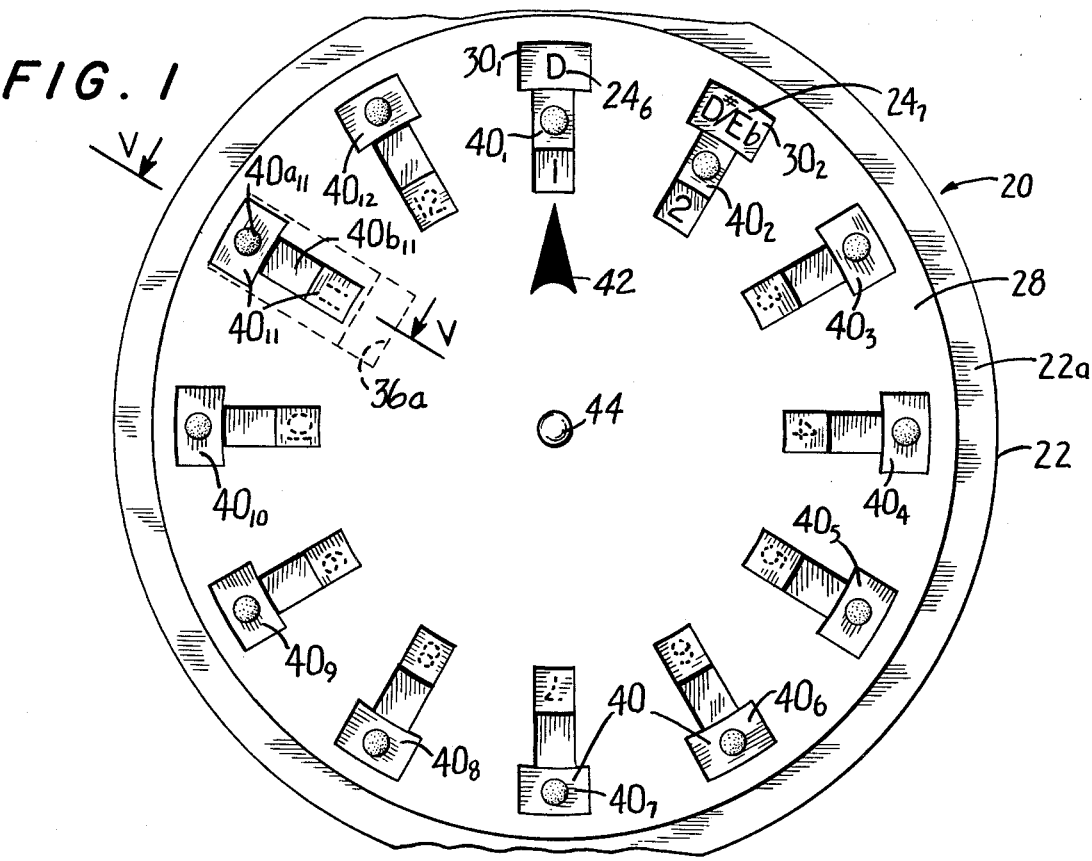

DEVICES FOR SELECTIVE DISPLAY OF INFORMATION

FIELD OF THE INVENTION

This invention relates to apparatus for displaying information and more particularly to educational devices which are operable to provide for selective display of musical information.

BACKGROUND OF THE INVENTION

The beginning student of music is typically overwhelmed at the outset of his study by the extensive permutations which arise from the number of distinct musical scales and the various rules applicable to the identification of chords and the like. By way of example, he is required to correlate single notes of the 12-step chromatic scale notes with the various scales of lesser and varying step content in appreciating melodic composition. This relatively simple correlation endeavor is expanded greatly in his efforts to understand harmonic composition, i.e., correlation of counterpart chords in respective different scales. Indeed, it is the exceptional skilled musician who can master the involved permutations without resort to reference materials.

The art has long recognized the problem at hand and has evolved various so-called musical slide rules, calculators and the like intended to facilitate solving the correlation problems. Such musical slide rules and calculators as are known to applicant include those shown in U.S. Pat. Nos. 1,643,303, 3,592,099, 3,728,932, 2,657,610, 3,635,122, 3,481,241 and 675,345.

Certain of these patents disclose devices which are encyclopedic in character, containing musical indicia in quite extended quantity. Typically, they present solutions together with a visually distracting excess of information. Others, such as U.S. Pat. No. 1,643,303, disclose devices which are less comprehensive in indicia content and present solutions by displaying only relevant indicia, however, through invariant display regimens of number limited by structural constraints. Thus, in this U.S. Pat. No. 1,643,303, three selectively-apertured rotatable disc members are stacked above a base member which includes indicia defining the steps of the chromatic scale, and this assembly is supported within a casing defining fixed further apertures. The student sets up a problem by preselected manipulation of the multiple disc members of these devices and the device selectively displays no more indicia than are involved in the solution. Thus, while preferable to the non-selective presentation devices of the other prior art patents, this type of device has structural complexity and problem solving limitations.

Absent from such heretofore known arrangements of musical calculators are characteristics of adaptiveness to student experimentation and effective integration of the display device and supplemental knowledge which the student generally has. The prior devices are thus considered traditional in direction, not permitting a student to pursue examination of musical arrays beyond the conventional and limiting his participation in the problem solving experience.

SUMMARY OF THE INVENTION

It is an object of the present invention to provide an improved musical information display device.

It is a more particular object of the invention to provide a musical information display device in form simplified over those devices presently known and adapted to present information in quantity no greater than that pertinent to the solution of a given problem.

It is an additional object of the invention to provide a musical information display device adapted to present a student with opportunity for experimentation and to more effectively integrate his participation in problem solving.

In attaining the foregoing and other objects, the invention provides in superposed relation a pair of members respectively rotatable about a common axis, one member having musical indicia uniformly circularly spaced at a common radial distance from such axis and a second member including closeable apertures in number equal to the first member indicia and uniformly circularly spaced at the same radial distance from the central axis as the first member indicia. The second member apertures are registrable selectively with the first member indicia and are openable in student-controlled progressions to facilitate display of intelligence.

The foregoing and other objects and features of the invention will be further evident from the following detailed description of preferred embodiments thereof and from the drawings wherein like reference numerals identify like parts throughout.

DESCRIPTION OF THE DRAWINGS

FIG. 1 is a plan view of one embodiment of a display device constructed in accordance with the invention.

FIG. 2 is a plan view of the bottom disc member of the FIG. 1 embodiment separated therefrom.

DESCRIPTION OF THE PREFERRED EMBODIMENTS

Figure 3:
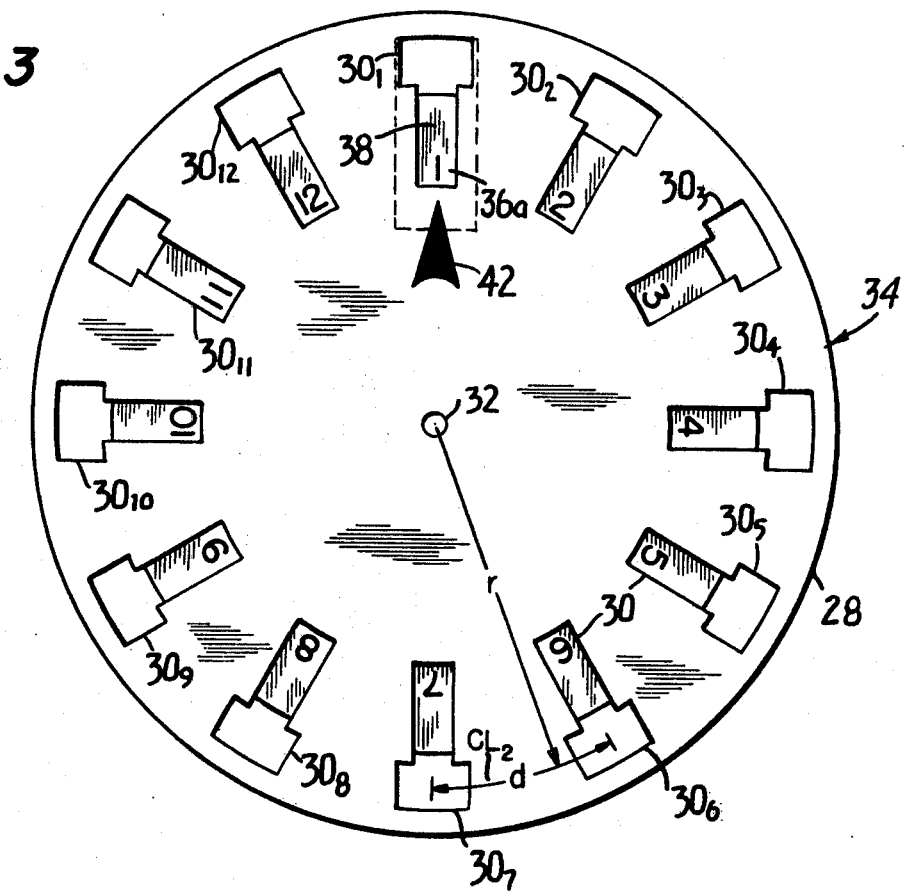
FIG. 3 is a plan view of the top disc member of the FIG. 1 embodiment separated therefrom and with its aperture closing elements removed.

Display unit 20, shown assembled in FIG. 1, includes a first member 22, conveniently in disc form, on one surface 22a of which are disposed musical indicia $24_1-24_{12}$ (FIG. 2) comprising alphabetic representations of the 12 steps of the chromatic scale with sharps and flats. Such indicia 24 are in a circular locus $CL_1$ of radial distance $r$ with respect to center opening 26 of member 22 and are uniformly spaced by arcuate distance $d$ in such circular locus.

A second member 28, also conveniently in disc form, is shown disposed in overlying relation to surface 22a of member 22 in FIG. 1. As illustrated in FIG. 3, wherein member 28 is shown separately from the FIG. 1 assembly, apertures $30_1-30_{12}$ are uniformly spaced by the same arcuate distance $d$ in a circular locus $CL_2$ of like radial distance r with respect to center opening 32 of member 28.

Figure 5:
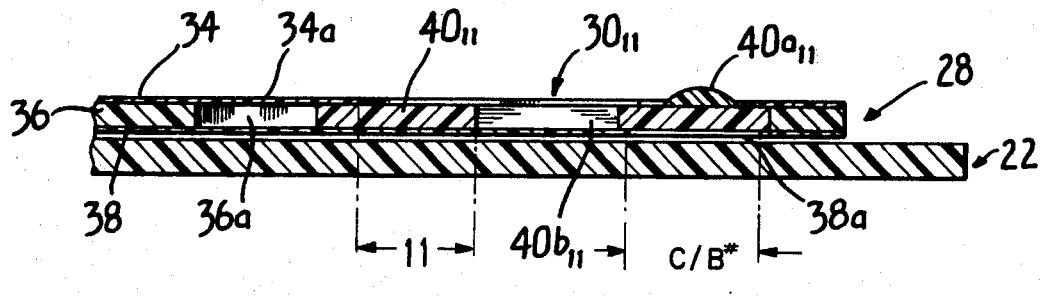
FIG. 5 is a sectional view of the device of FIG. 1 as seen from plane V—V of FIG. 1.

As is seen in FIG. 5 which shows aperture $30_{11}$, member 28 is multi-layered in this embodiment, including an upper layer 34, an intermediate layer 36 and a bottom layer 38 suitably secured together as by an adhesive. Opening 34a formed in layer 34 is generally T-shaped in configuration. Intermediate layer 36 defines a radially extending slot 36a below opening 34a. Bottom layer 38 includes opening 38a situated directly below the radially outward portion of T-shaped opening 34a and includes numeric identifiers 1–12 on its upper surface (FIG. 3).

Figure 4:
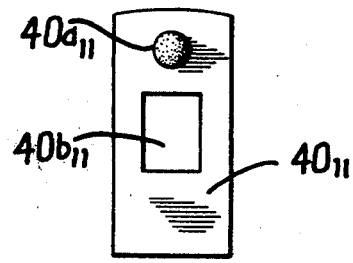
FIG. 4 illustrates one of the aperture-closing elements of the FIG. 1 embodiment separated therefrom.

Referring jointly to FIGS. 1, 4 and 5, aperture-closing/-opening elements or gates $40_1$–$40_{12}$ are contained in radial slots 36a and are translatable between radially inward (gate open) and radially outward (gate closed) positions by displacing button-shaped projections, such as $40a_{11}$. Gates 40 include openings, $40b_{11}$ for gate $40_{11}$, disposed radially inward of projection $40a_{11}$.

In the assembled showing of FIG. 1, gates $40_3$–$40_{12}$ are shown in their closed positions, their associated identifiers not being displayed and accordingly shown in phantom. Gates $40_1$ and $40_2$ are open, displaying identifiers 1 and 2. Member 28 includes a reference index 42 fixedly positioned adjacent gate $40_1$, establishing this gate as the reference or origin gate. With members 22 and 28 rotated about pivot pin 44 and mutually positioned as in FIG. 1, and with gates $40_1$ and $40_2$ open, musical indicium D is displayed in registry with identifier 1 and musical indicium $D^\#$/$E_b$ is displayed in registry with identifier 2. This display situation will be appreciated as presenting the first and second steps of the chromatic scale in the key of D. Opening of the remaining gates will provide display of the entire chromatic scale in the key of D. The situation attending the opening of gate $40_{11}$ will be seen from FIG. 5 which shows this gate closing aperture $30_{11}$. On radially inward (leftward) translation of gate $40_{11}$, opening $40b_{11}$ thereof is brought into registry with the expanse of layer 38 having identifier 11 thereon. At the same time, gate $40_{11}$ is moved clear of opening 38a of layer 38, thus exposing through member 28 the expanse of member 22 having the musical indicium $C/B^\#$ thereon.

By reason of the independence of operation of gates 40, the display possibilities of the disclosed apparatus are without regimentation. Each gate is operable, i.e., movable from gate closed position to gate open position, randomly and independently of the condition of closure of the remainder of the gates. Gate $40_1$ (FIG. 1) may be operated (opened) no matter what are the positions (closed or open) of gates $40_2$–$40_{12}$. Permutative display possibilities are accordingly extended especially when it is considered that relative rotation of members 22 and 28 further expands permutative display capacity. Thus, rotation of member 22 counterclockwise relative to member 28 by 60° from the FIG. 1 relation thereof will provide display of the first two steps of the chromatic scale in the key of E, and so forth.

The coordinated arrangement of indicia 24 in a musical progression and of identifiers 1–12 in a numeric sequence facilitates use of the FIG. 1 apparatus for various correlation exercises, such as identification of chords. Let it be assumed that the student seeks to determine the major scale major triad in the key of A. Through fundamental triad definition for the various musical scales of interest, either known beforehand to the student or printed on the undersurface of member 22, the student brings to the FIG. 1 apparatus an understanding that the major scale comprises the step (identifier) sequence 1-3-5-6-8-10-12 having major triad defined as 1-5-8. The student opens gates $40_1$, $40_5$ and $40_8$ and then mutually rotates members 22 and 28 until indicium A is displayed in aperture $30_1$. He reads through apertures $30_5$ and $30_8$, respectively, the indicia $C^\#$ and E, thereby determining the major scale major triad A-$C^\#$-E. In this connection, apertures $30_5$ and $30_8$ also display indicia $D_b$ and $F_b$ which are alternatives to $C^\#$ and E, respectively, and usable in place thereof in different keys as is well understood. Accordingly, the term indicium is used for $C^\#/D_b$ and for $E/F_b$.

As will be understood to those of ordinary musical skill from the foregoing, the FIG. 1 apparatus is similarly adapted to determination of chords other than the major triad, to modulation practices and to visualization of the separation of sequential steps in different scales. Also, with gates $40_1$–$40_{12}$ being independently operable non-classical cross-correlations may be established and evaluated.

A further use of the FIG. 1 apparatus involves simple transposition of a melodic composition from one key to another. Let it be assumed that the foregoing major triad in the key of A is to be transposed into the key of G. With gates $40_1$, $40_5$ and $40_8$ open, either of members 22 and 28 (or both) are rotated until indicium G is displayed in aperture $30_1$. The notes B and D are now read in apertures $30_5$ and $30_8$ and the major triad in the key of G is noted as G-B-D. Let it be assumed, for purposes of explanation, that the note sequence A, $C^\#$, E in the key of A was to be transposed into the key of G without having been reached by the major triad determination above. Gate $40_1$ is opened and members 22 and 28 are rotated separately or jointly until the indicium A is displayed in aperture $30_1$. Next the first note in the composition, $C^\#$, is read from the staff. Gates $40_2$–$40_{12}$ are opened and closed until the gate ($40_5$) is found which displays indicium $C^\#$. Gate $40_5$ and gate $40_1$ are left in open position. Members 22 and 28 are now rotated separately or jointly until the new keynote (G) is displayed in aperture $30_1$. The keynote G counterpart note to $C^\#$ in the key of A is now read in aperture $30_5$, namely, B. This practice is now repeated for the other notes sequentially in the composition.

Figure 6:
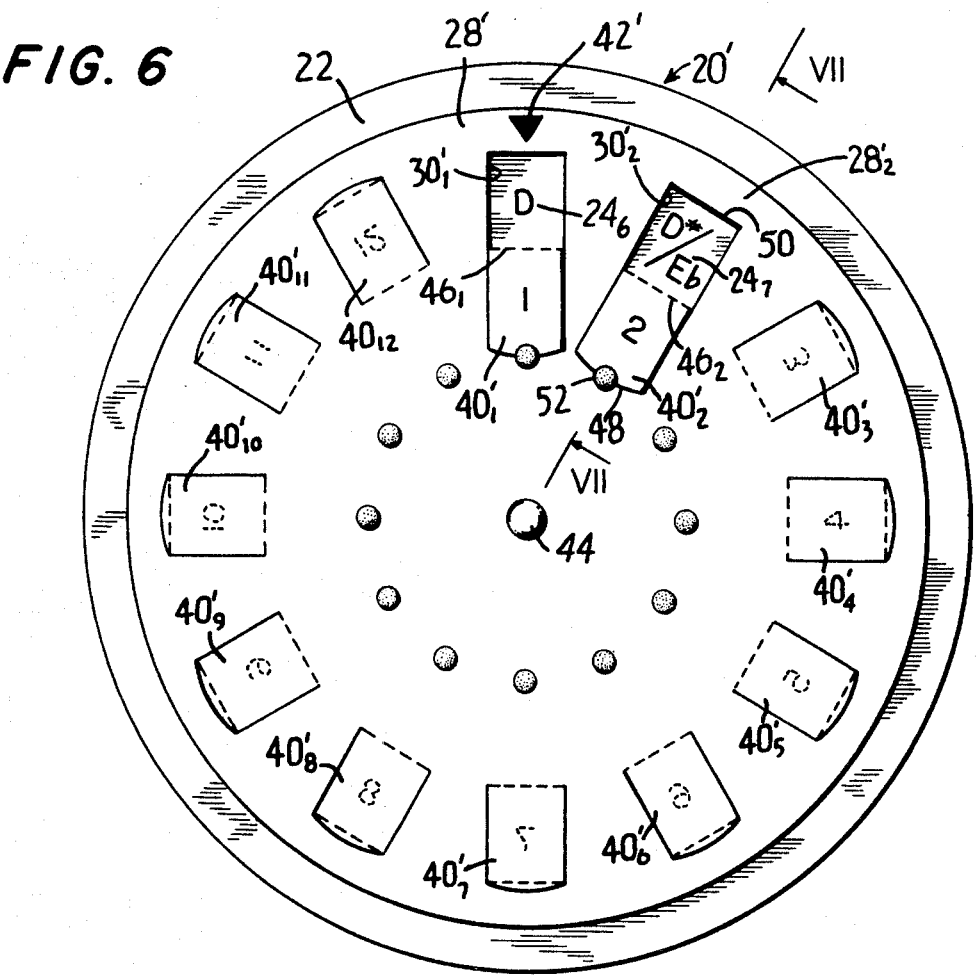
FIG. 6 is a plan view of an alternate embodiment of apparatus constructed in accordance with the invention.
Figure 7:
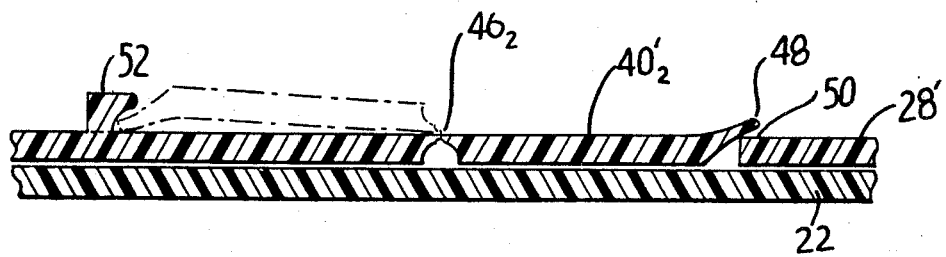
FIG. 7 is a sectional view of the device of FIG. 6 as seen from plane VII—VII of FIG. 6.

Turning now to FIGS. 6 and 7, display unit 20' includes bottom disc member 22 of FIG. 2. Overlying member 22 is a sheet disc member 28' having apertures, for example, $30'_1$ and $30'_2$, closeable respectively by elements or gates $40'_1$–$40'_2$, which are in flap configuration, movable about hinge lines such as $46_1$ and $46_2$. Gates $40'_1$–$40'_{12}$ are preferably integral with member 28' and the latter and member 22 are comprised of suitable plastic material. As shown in FIG. 6, gates $40'_1$–$40'_{12}$ have respective identifiers 1–12 disposed on the undersurface thereof and displayed on gate opening, as shown for gates $40_1$ and $40_2$, in juxtaposition with the member 28 indicia. As in the case of unit 20, unit 20' includes a central pivot pin 44 and member 28' includes a reference index 42'. For maintaining the gates in respective closed and open positions, they are preferably formed, as shown for gate $40'_2$ in FIG. 7, with a lipped end portion 48 which may be frictionally engaged by portion 50 of disc member 28' or may snap under peg 52.

Various changes may be introduced in the foregoing without departing from the invention. For example, motion of the indicia bearing member to the apertured member may be translatory as contrasted to the rotative motion above shown. Accordingly, the particularly disclosed preferred embodiments are intended in an illustrative and not a limiting sense. The true spirit and scope of the invention is set forth in the following claims.

What is claimed is:

1. A musical information display device comprising a first member having a surface bearing spaced musical indicia, a second member overlying said first member surface and rotatable relative to said first member, said second member having apertures registrable with said first member indicia on such relative rotation of said first and second members and a closure element for each said aperture operable for opening the same to provide display therethrough of the first member indicium registered therewith, each said closure element being operable independently of operation of the others of such closure elements.

2. The device claimed in claim 1 wherein said indicia are uniformly circularly spaced on said first member and wherein said apertures are uniformly circularly spaced on said second member.

3. The device claimed in claim 1 further including a distinct identifier for each said aperture, said identifiers being displayed jointly with displayed indicia.

4. The device claimed in claim 3 wherein said indicia are uniformly circularly spaced on said first member and wherein said apertures and such identifiers are uniformly circularly spaced on said second member.

5. The device claimed in claim 4 wherein said first and second members are each rotatable about a common axis, said closure elements being supported by said second member in juxtaposition with said apertures for movement radial with respect to said common axis.

6. The device claimed in claim 3 wherein each said closure element bears such identifier on a surface thereof.

7. The device claimed in claim 3 wherein said indicia are arranged in a progression defining a musical scale and wherein said identifiers are numerals arranged in sequential order.

8. The device claimed in claim 7 wherein said musical scale is the 12-step chromatic scale.

9. A musical information display device comprising:

a. a first member having musical indicia uniformly circularly spaced thereon at a common radial distance from a central axis therethrough;
   b. a second member overlying said first member and rotatable relative to said first member about said central axis, said second member having apertures therethrough in number equal to the number of said first member indicia, said apertures being uniformly circularly spaced from said central axis at the same radial distance therefrom as said first member indicia; and
   c. closure means for each said aperture operable for opening the same independently of the condition of closure of the remainder of said apertures, whereby said indicia are displayed through said apertures selectively in accordance with both the rotational position of said second member with respect to said first member and operation of said closure means.

10. The device claimed in claim 9 further including a distinct identifier for each said aperture, said identifiers being displayed jointly with displayed indicia.

11. The device claimed in claim 10 wherein each said closure means comprises an element supported by said second member in juxtaposition with one of said apertures for movement radial with respect to said common axis.

12. The device claimed in claim 9 wherein each said closure means comprises an element bearing one of said identifiers on a surface thereof.

13. The device claimed in claim 9 wherein said indicia are arranged in a progression defining a musical scale and wherein said identifiers are numerals arranged in sequential order.

14. The device claimed in claim 13 wherein said musical scale is the 12-step chromatic scale.

15. A musical information display device comprising a first member having a surface bearing spaced musical indicia, a second member overlying said first member surface and movable relative to said first member, said second member having apertures registrable with said first member indicia on such relative movement of said first and second members and a closure element for each said aperture operable for opening the same to provide display therethrough of the first member indicium registered therewith, each said closure element being operable independently of operation of the others of such closure elements.

* * * * *